March 31, 1936.  J. SNEED  2,035,843
BRAKE
Filed March 16, 1929    6 Sheets-Sheet 1

Inventor
John Sneed
By Bates, Golrick & Teare
Attorneys

March 31, 1936.  J. SNEED  2,035,843
BRAKE
Filed March 16, 1929  6 Sheets-Sheet 2

Inventor
John Sneed
By Bates, Golrick & Teare
Attorneys

Inventor
John Sneed
By Bates, Golrick & Teare
Attorneys

March 31, 1936.  J. SNEED  2,035,843

BRAKE

Filed March 16, 1929  6 Sheets-Sheet 4

Inventor
John Sneed
By Bates, Golrick & Teare
Attorneys

March 31, 1936.  J. SNEED  2,035,843
BRAKE
Filed March 16, 1929   6 Sheets-Sheet 6

Inventor
John Sneed
By Bates, Golrick & Teare
Attorneys

Patented Mar. 31, 1936

2,035,843

UNITED STATES PATENT OFFICE 2,035,843

BRAKE

John Sneed, Ferndale, Mich., assignor, by mesne assignments, to The Midland Steel Products Company, Cleveland, Ohio, a corporation of Ohio, trustee for Steeldraulic Brake Corporation, Detroit, Mich., a corporation of Michigan Application March 16, 1929, Serial No. 347,515

29 Claims. (Cl. 188—78)

This invention relates to vehicle brakes and more particularly constitutes an improvement on a well known brake, a form of which is illustrated in my copending application, Serial No. 261,760, filed March 15, 1928, now Patent No. 1,956,702 granted May 1, 1934.

It is among the objects of my invention to provide a brake including a control therefor, the parts of which may be easily and readily assembled. Another object of my invention is to eliminate frictional losses in the operation of the brake and thereby increase its operating efficiency. Another object is to provide simple and effective means for adjusting the brake to compensate for wear. Another object is to provide means for withdrawing the brake shoe from engagement with the drum and to hold it out of contact therewith in a desired and adjustable position. A further object is to provide a spreading or shoe expanding means which may be easily assembled and in which frictional losses are reduced to a minimum and which has a novel arrangement of parts giving an additional and super-normal effective range to the mechanism. A further object is to provide an apron or backing plate for supporting the brake shoe and carrying the brake anchor. A still further object is to provide an anchorage incorporated with the brake apron which is of novel and simple construction and capable of carrying high braking torque. A further object is to arrange an apron or backing plate of relatively light stock reinforced by an arrangement of ribs or corrugations to give it great strength.

Other objects will appear from the following description of a preferred form of my invention, reference being had to the accompanying drawings. The essential characteristics are summarized in the claims.

Figure 1:
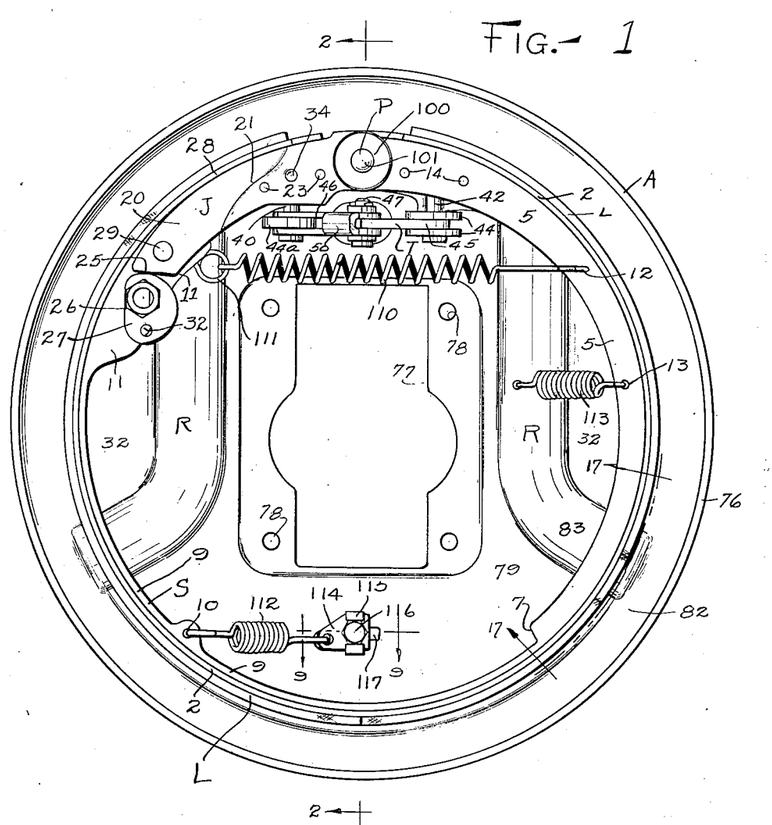
Fig. 1 is an elevation of the assembled parts constituting the brake.
Figures 2, 3, 4, 5:
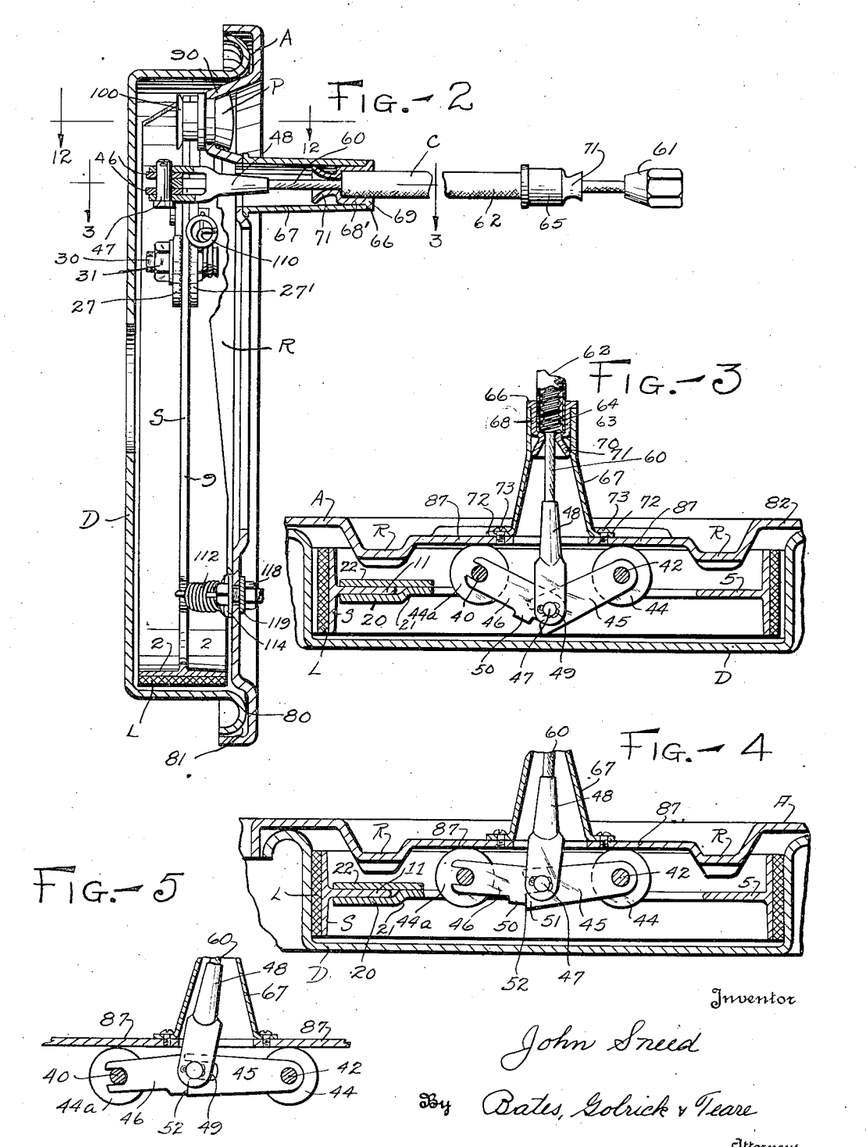
Fig. 2 is a vertical section taken along the line 2—2 of Fig. 1.
Fig. 3 is a horizontal section taken along the line 3—3 of Fig. 2.
Figs. 4 and 5 are similar views showing the parts as they are displaced during operating of the brake.

Referring to the drawings and particularly Figs. 1 and 2, I illustrate my brake in conjunction with the usual rotating drum D into which is expanded a substantially annular brake shoe S carrying suitable brake lining L. Closing the open face of the drum and supporting the brake shoe and taking the torque is a backing plate or apron A which carries an anchor pin P and is ribbed for the sake of reinforcement as at R. Opposite ends of the shoe engage the anchor pin and either of the ends of the shoe delivers braking torque to the anchor depending on the direction of drum rotation. An adjustor J is carried by one end of the shoe by means of which the effective length of the shoe may be changed from time to time to compensate for wear. A horizontally or axially acting toggle T has its outer ends engaging the ends of the shoe and serves to force the shoe ends apart and expand the brake into engagement with the drum. The mid portion of the toggle is connected with a flexible control C including a cable and flexible conduit, to be presently described. A novel arrangement of retractor springs, to be presently described acts to draw the shoe onto the anchor and hold it out of contact with the drum in idle position.

Figures 23, 24:
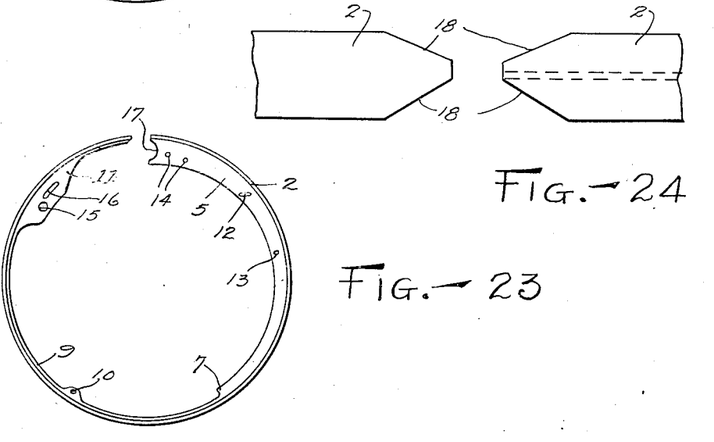
Fig. 23 illustrates the shoe after the rib has been cut away to a finished contour.
Fig. 24 illustrates the opposite shoe ends having been trimmed to finished form.

To describe the brake shoe S and the method of making it, reference may also be had to Figs. 21 to 24 inclusive. The brake shoe S and the method of making the same are separately claimed in a divisional application filed April 10, 1930, Serial No. 443,061 now Patent No. 1,916,861 granted July 4, 1933. To form the shoe, I prefer to take a piece 1 of hot rolled stock formed in T-section having a body part 2 and a flange part 3 cut to a desired length and to roll this stock into a split ring 4 (see Fig. 22) so that the flat part 2 becomes the cylindrical lining supporting part of the shoe and the flange part 3 becomes an inwardly extending stiffening flange of uniform depth. To lend flexibility to the shoe in the places and to the degree which I desire, I thereafter cut away part of the flange 3 and leave a flange as shown in Fig. 23. The remaining flange comprises a part 5 of full depth at one end of the shoe and preferably of decreasing depth to a point 7 toward the middle of the shoe where the depth of the flange is changed abruptly, as shown. The abrupt change in depth of flange makes a sharp division between relatively rigid and relatively flexible portions of the shoe and greatly reduces or eliminates the tendency of the brake to squeal. From the point 7 throughout substantially all of the remainder of the shoe, the flange is cut away to a very shallow depth, as at 9, to give that part of the shoe its greatest flexibility. A small projection 10 in the part 9 of the flange remains after the shearing operation, in which is punched an eyelet to which one of the retractor springs is secured. A portion 11 of the flange near the flexible end of the shoe remains after the shearing operation to which portion is attached the adjustor, to be presently described.

Preferably coincident with or after the shearing operation, holes and eyelets are punched in the flange for various purposes. The eyelets 12 and 13 receive the ends of retractor springs. The holes 14 and 15 in the rigid end of the shoe receive rivets for securing a thrust pin carrying part, and the circular hole 15 along with the elongated opening 16 are used in the retention of the adjustor. In the shearing operation wherein part of the flange is cut away, the end of the flange is notched, as at 17, to engage the anchor pin. As shown in Fig. 24, I prefer that the ends of the lining supporting part of the shoe be trimmed, as at 18, to avoid contact with the apron at the anchorage. The body of the shoe thus comprises a single piece formed as a split ring and reinforced with an integrally formed radial flange having depth and configuration determined by shearing or trimming after the shoe is rolled. The shoe thus comprises a relatively rigid part substantially throughout the length of the part 5 of the flange and a relatively flexible part throughout the remainder of the shoe. The relatively rigid part of the shoe preferably has within it an increased degree of rigidity toward the end.

Associated with the part 11 of the flange near the relatively flexible end of the shoe is an adjustor J whose function it is to change the effective length of the shoe to compensate for wear. The adjustor comprises a plate 20 (see Fig. 1) having a portion lying beside the flange 11 and having a portion offset, as at 21, extending beyond the flange 11 and substantially in the plane thereof. Referring also to Figs. 12, 14, 15 and 16, the adjustor also comprises a plate 22 of similar outline to the plate 20, which lies on the opposite side of the part 11 and is secured to the plate 20 by such means as rivets 23 so that the two plates act together. Both plates are notched at one end, (see Figs. 14 and 15) as at 24 to engage the anchor pin and are both engaged at the other ends, as at 25, by a cam 26 formed of a pair of eccentric plates 27 and 27' which lie on opposite sides of the flange 11 and which may be adjustably clamped in any desired position, as illustrated by contrasting the positions shown in Figs. 14 and 15.

The plates 20 and 22 comprising the adjustor J have an arcuate surface engaging the inner side of the lining supporting part of the shoe, as at 28 and the plates carry between them an axial pin 29 which extends through the elongated arcuate slot 16 in the flange 11. Thus the pin 29 holds the end of the adjustor against radial movement but permits circumferential movement. The cam comprises two plates each having a non-circular opening through which extends a bolt 30 with a flattened side which holds them fixed relative to each other. The inner faces of the plates 27 and 27' are knurled (see Figs. 2 and 16) so that they securely grip the flange when they are clamped thereon by the nut 31 acting through the bolt 30. The plates may be apertured, as at 32, to receive a pin or tool by which they may be rotated, when free, to any desired position at which it is desired that they may be clamped.

Figures 12, 13, 14, 15, 16:
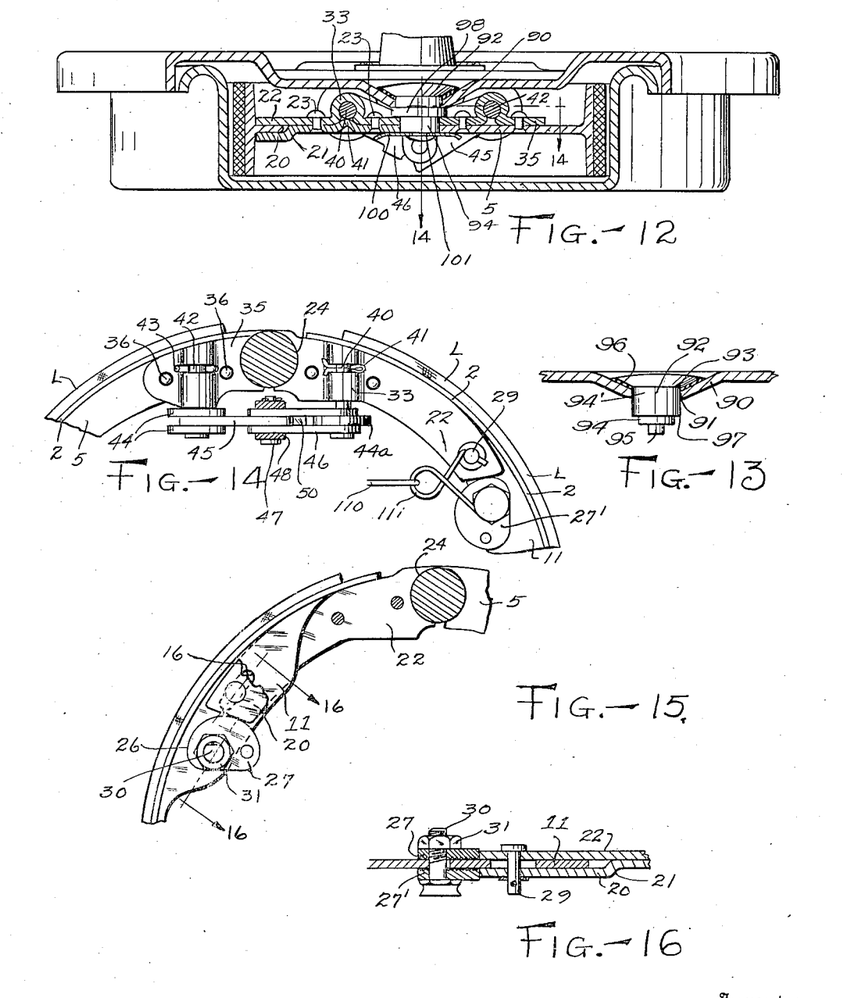
Fig. 12 is a section taken along the line 12—12 of Fig. 2.
Fig. 13 is a similar view taken before the anchor pin has been upset into engagement with the apron.
Fig. 14 is a section taken along the line 14—14 of Fig. 12, showing the rearward elevation of the shoe ends including the adjusting and spreading mechanism.
Fig. 15 is a fragmentary view of one of the shoe ends including the adjusting mechanism illustrated in Fig. 1 showing the parts in a different position of adjustment.
Fig. 16 is a section taken along the line 16—16 of Fig. 15.

As shown in Figs. 12 and 14, the plate 22 is deformed, as at 33, to receive a vertically or substantially radially extending pin 40. The plate 20 may be dimpled as at 34 (see Fig. 1) to engage and support the pin 40. Such means as a cotter pin 41 retains the pin 40 against vertical movement. A similar pin 42 is carried by the other end of the shoe within a plate 35, which is secured to the flange part 5 of that end of the shoe by such means as rivets 36. The pin 42 is retained against vertical movement by a cotter pin 43. Thus there are symmetrically arranged at both ends of the shoe and in constant relation to the anchorage opposite and generally vertically or radially extending thrust pins.

The pins 40 and 42 perform at least a dual function of engaging the ends of the toggle T and of carrying rollers which space the shoe ends laterally from the apron and give the ends of the toggle a rolling support on the apron. The pins have enlarged heads and the pin 42 carries a freely rotating pair of rollers 44, one above and one below the male toggle arm 45. The pin 40 has an enlarged head and carries a freely rotating roller 44a and pivotally and slidably received, above and below the roller, the bifurcated ends of the female toggle arm 46 (see also Figs. 3 to 7 inclusive). The inner ends of the toggle arms engage a common pivot pin 47 which in turn is engaged by a yoke 48 (see Fig. 2) which yoke is connected to an actuating cable 60. Tension on the cable (see Figs. 3 and 4) tends to flatten the toggle and spread the shoe ends and at the same time exerts a lateral force through the pins 40 and 41 in the direction of the apron. As the shoe ends are moved apart the rollers roll along the apron so that the shoe ends are spread with a minimum of frictional resistance.

Referring to Figs. 3, 4, and 5 and as mentioned above, the toggle comprises a male arm 45 pivotally connected to the thrust pin 42 at one end and having its other end bifurcated, as at 49 (see also Figs. 6, 7, and 8) which bifurcated end slidably and pivotally engages the pivot pin 47. The female arm of the toggle comprises upper and lower parts folded over and joined together by a portion 50 which bridges both parts. The inner end of the female arm 46 is pivotally connected to the pin 47 and has its outer end bifurcated to slidably and pivotally engage the thrust pin 41. Tension on the cable draws the yoke 48 through an aperture 75 in the apron and tends to flatten the toggle to the position indicated in Fig. 4. In the position indicated in Fig. 4, it will be appreciated that the toggle is approaching dead center and continued movement of the yoke might pull the toggle over dead center and render the brake inoperative. However, the extreme inner end of the male arm 45 engages the connecting portion 50 of the female arm 46 and further inward movement of the yoke changes the pivot point of the toggle from the axis of the pin 47 to the point of contact 52 between the parts 50 and 51 of the inner ends of the male and female toggle arms. Thus as the yoke continues its movement, the toggle may assume the position illustrated in Fig. 5, the arms being in contact at the point 52 and the pin moving out of the bifurcated end 49 of the male arm 45. In the particular arrangement of parts shown, one of the arms of the toggle will be engaged by the apron before the toggle is drawn past its new effective dead center, i. e. the point 52 in the line of the centers of the pins 40 and 42, (see also my copending application Ser. No. 290,945).

As mentioned above, the yoke 48 is secured to a cable 60 and the brake is expanded by a force putting the cable in tension. The other end of the cable, as illustrated in Fig. 2, carries a connecting part 61 which may be secured to the brake operating linkage, carried by the chassis of the vehicle in the usual manner, not shown. The cable may be termed part of the flexible control C, mentioned above and considering the control as a whole, it also includes a flexible conduit or housing 62 (see Fig. 3), cupped end fittings 65 and 66, and a tubular bracket 67 detachably secured to the apron.

The flexible housing or conduit for the cable may preferably be throughout its body similar to that illustrated and described in my copending application Serial No. 286,153, filed June 18, 1928, now Patent 1,959,692 granted May 22nd, 1934. Such a housing or conduit comprises interfitting wire strands 63 and 64 arranged to move laterally with respect to each other when the conduit curves so that the effective length of the conduit does not vary in curvature. As shown in Fig. 4, the housing or conduit is cut or ground off squarely at the ends and is there received in the cupped end members, the member 66 being illustrated in Fig. 3. A dust proof fabric casing 68' overlies the conduit and serves to retain lubricant therein. This casing as shown in Fig. 2, is also received within the cupped end members.

The cupped end members may be simple stampings, each positioned over the ends of the housing and crimped slightly to secure the parts together. The cupped members 65 and 66 may be similar and each has a cylindrical body part 68 with an outwardly extending bead or shoulder 69. The bottoms of the cups comprise radial parts 70 borne directly against the ends of the conduit or housing 62. Extending beyond the bottoms of the cups are annular outwardly flaring parts 71 which receive and guide the cable in its movement longitudinally of the conduit. The cup 65 is intended to be secured to the frame or similar part of the vehicle as illustrated in Figs. 2 and 3, the cup 66 extends into the cylindrical end portion of the bracket 67. This part of the bracket 67 may be crimped slightly to hold the end member 66 in place while the parts are shipped and assembled. In operation, load in compression is passed from the housing or conduit 62 through the end member 66 via the shoulder 69 onto the end of the bracket 67, which in turn transmits the load to the apron. The bracket 67, as shown in Figs. 2 and 3, may be drawn from flat stock or expanded from tubular stock to comprise a hollow body having a greater horizontal dimension than vertical dimension at its far end and having a substantial circular section at the end engaging the end member 66. The greater end of the bracket 67 is flanged and punched as at 72 and is detachably secured to the apron by such means as screws 73.

Figure 6:
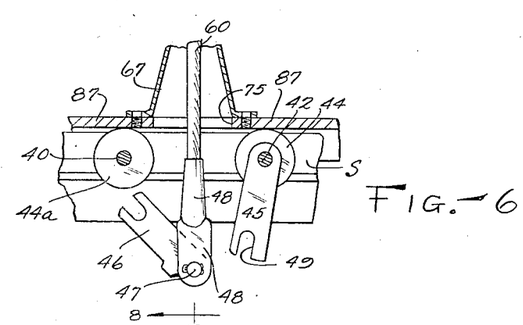
Figs. 6, 7, and 8 are also similar views showing the manner of assembling the control and spreading mechanism.
Figure 7:
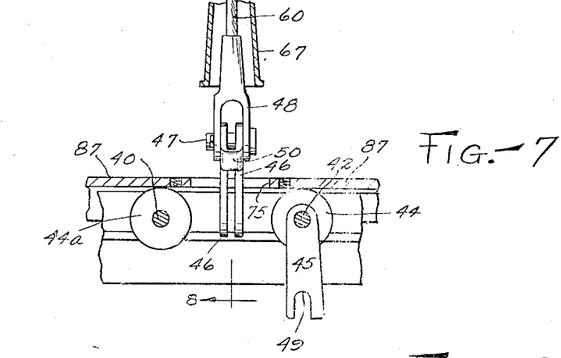
Figures 8, 9, 10, 11:
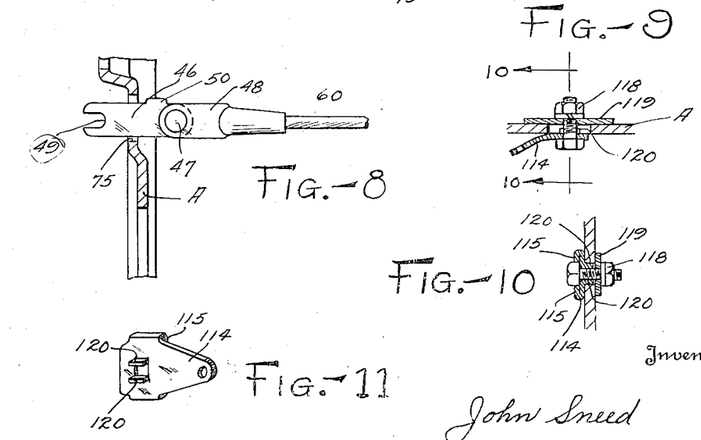
Fig. 9 is a horizontal section taken along the line 9—9 of Fig. 1 showing the adjustable connection between one of the retractor springs and the apron.
Fig. 10 is a section taken along the line 10—10 of Fig. 9.
Fig. 11 is a perspective view of the clip illustrated in Figs. 9 and 10 to which one of the retractor springs is connected.

The assembly of the control may best be understood by referring to Figs. 2, 3, 6, 7, and 8. The conduit 62 is wound or assembled as a unit and thereafter covered with the fabric 68. In practice either the yoke 48 or the connecting part 61 is secured to one end of the cable 60 prior to the cable being passed through the conduit. The end members 65 and 66 are forced over the ends of the conduit, as illustrated in Fig. 2, and lightly crimped or frictionally held in place and thereafter the cable is passed through the conduit and then the remaining unit, either the yoke or the member 61, is secured. The tubular bracket 67 is preferably of such size that the yoke 48 may be passed through it and the cupped end member 66 seated in the circular end of the bracket. Thereafter the female arm 46 of the toggle is pivotally secured to the yoke, as illustrated in Figs. 6, 7, and 8. Thereupon the control including one of the toggle arms and the bracket 67 becomes a complete sub-assembly.

As mentioned above, the other of the toggle arms 45 is pivotally secured and carried by one of the shoe ends and constitutes part of the shoe assembly. As illustrated, the apron is provided with an elongated opening 75 adjacent to which the greater end of the bracket 67 is secured, and through which the female toggle arm and the yoke of the control assembly are passed when the finished brake is assembled, as illustrated in Figs. 7 and 8. As illustrated in Fig. 6, the female toggle arm having been passed through the opening is in a position to have its bifurcated end engage the pin 40 and the male toggle arm is in a position to receive the pivot pin of the toggle 47. The bracket 67 is shown to lie adjacent the opening 75 and lacks only the screws 73 to secure the control to the apron. To disassemble the parts the procedure is necessarily the reverse, care being first had to disconnect the remote end of the cable from the brake operating linkage so that the cable may be drawn through the opening in the apron to relieve the toggle arms from their operative positions. Thereafter the steps, as consecutively appear Figs. 6, 7, and 8, may be followed. The toggle mechanism and apparatus for operating same are claimed in a separate copending application Serial No. 565,749, filed September 29, 1931, which constitutes a division of this application.

The apron A (see Figs. 1, 12, 13, 18, 19 and 20) closes the open face of the drum, carries and comprises at least in part the anchorage, supports the shoe, carries the control and is in turn secured to the axle or the steering knuckle, as the case may be. In the interest of economy and to reduce the weight of the unsprung parts of the vehicle, I desire to make the apron as light as possible without sacrificing its strength and other utility. By a system of ribs and corrugations, I am able to strengthen the apron so that its weight may be reduced.

Figure 17:
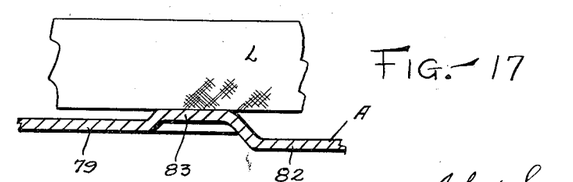
Fig. 17 is a section taken along the arcuate line 17—17 of Fig. 1.

The apron comprises essentially a disc with a flanged periphery 76 and a central opening 77 adjacent to which are lesser openings 78 provided for securing the apron to either the vehicle axle or steering knuckle, the provision for a steering knuckle being illustrated. The preferred embodiment of the apron shown in Fig. 18, comprises a planular area 79 which extends generally around the central opening, and which is bounded above and to the left and right by an inverted U-shaped rib R, raised inwardly, that is, toward the brake shoe. The lower boundary of the planular area 79 is the channel 80 (see also Fig. 19) into which the edge of the drum extends, as at 81, see Fig. 2. Above and to the right and left of the rib R is a lower planular area 82 formed in the plane of the bottom of the channel 80 (see also Fig. 20). The rib R, as illustrated, is generally the shape of an inverted U having its lower extremities 83 turned and extending radially outwardly and terminating in the lower planular area 80—82. The extremities of the rib are preferably spaced about 120° apart and upon these extremities the edge of the brake shoe rests and is supported (see Fig. 17), so that the body of the shoe is held out of contact with the apron.

Figures 18, 19, 20:
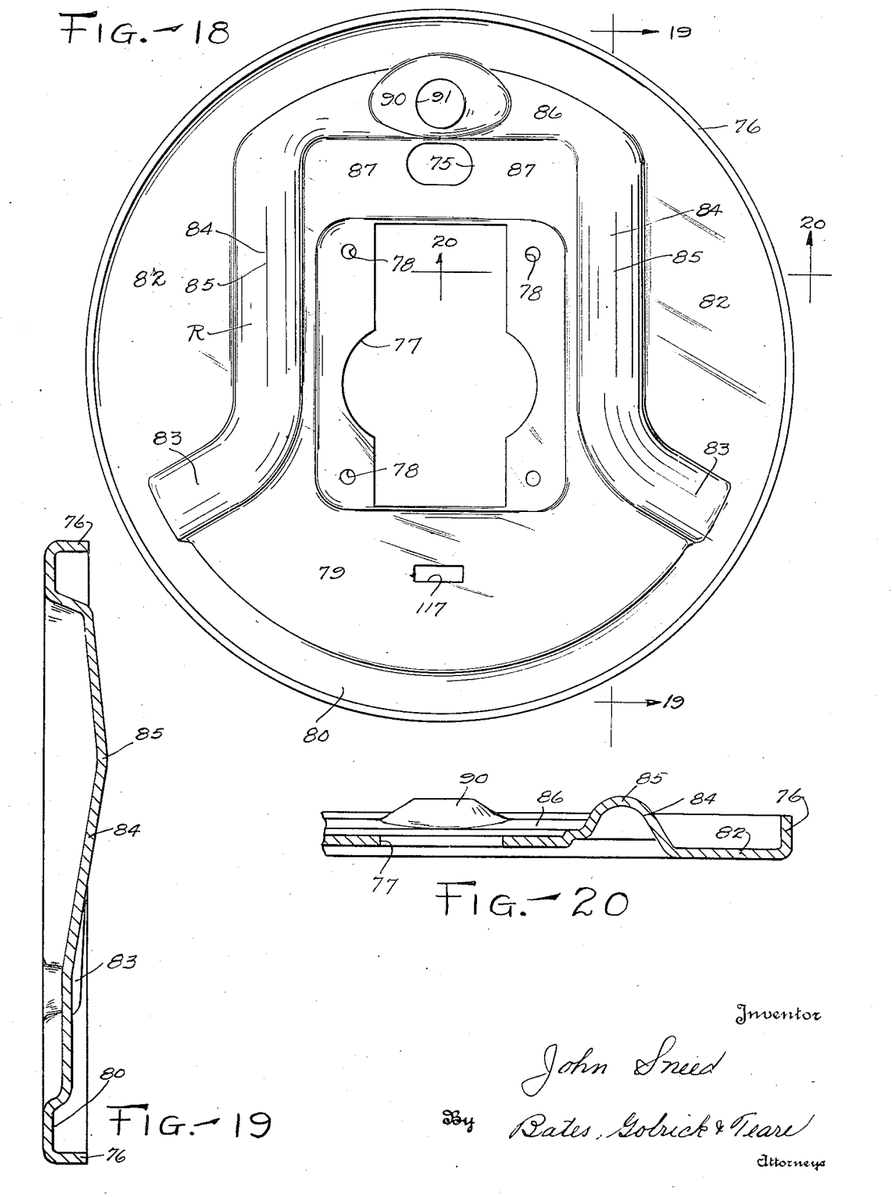
Fig. 18 is an elevation of the apron and backing plate.
Fig. 19 is a section taken along the line 19—19 of Fig. 18.
Fig. 20 is a section taken along the line 20—20 of Fig. 18.
Figure 21:
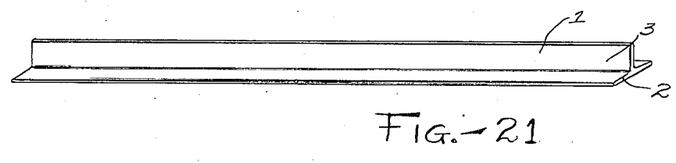
Fig. 21 illustrates a piece of T stock from which the shoe is formed.
Figure 22:
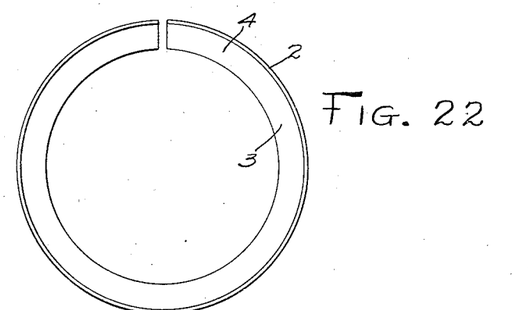
Fig. 22 illustrates the shoe as initially rolled into a split ring.

The rib R also comprises generally vertically extending portions raised to a maximum height at about the point 85 (see Figs. 19 and 20). The upper part of the rib R, including principally the portion 86 is spaced radially inward from the periphery of the apron a greater amount than the ends of the extremities 83 of the rib so the lateral edge of the shoe will not contact with the rib or apron except on the extremities 83 of the rib. As mentioned above, the ends of the shoe are laterally supported by the rollers 44 and 44a and these rollers contact with the apron at 87 and may move to the right or left, as shown in Fig. 18, in the upper part of the planular area 79. Thus the shoe is supported at three general points spaced about 120° apart. Suitable retractor springs and other means, to be presently described, hold the shoe in lateral engagement with the apron.

Incorporated with the apron and more particularly with the ribbed portion thereof is the anchorage onto which braking torque is imposed and against which the ends of the shoe pivotally abut. It will of course, be appreciated that the duty of the anchorage as a whole depends upon the couple created when torque is delivered to it. I desire to make the anchor pin short and to effect the anchorage laterally adjacent an integral part of the apron. To this end there is raised in the central upper part of the rib R a laterally elongated portion 90, (see also Figs. 1, 12, and 20), apertured at 91. Through the aperture 91 the anchor pin 92 extends and is permanently secured. It will be noted that the axis of the anchor pin is so placed with relation to the rib structure that torque imposed upon it is carried through the rib structure and distributed by the rib structure to the body of the apron. The anchor pin 92 is formed to the shape indicated in Fig. 13 preferably by an upsetting process to have a laterally elongated head 93, a cylindrical body portion 94' closely fitting the opening 91 in the apron, a lesser cylindrical portion 94 and a tip 95.

To assemble the anchorage, the parts are arranged as shown in Fig. 13 and a non-metallic shim 96 (see my copending application Serial No. 197,330, now Patent No. 1,726,045 of August 27, 1929) may be inserted between the head of the anchor and the apron. After the parts are placed, as shown in Fig. 13, the cylindrical body is deformed or upset by a hollow die having an interior diameter equal to the small cylindrical portion 94 and having a cutting edge and face engaging the shoulder 97 to force and shear the metal backwardly and outwardly, as shown in Figs. 12 and 13, into an integral ring or annular shoulder 98, see Fig. 12. Thus that portion of the apron immediately adjacent the opening 91 is permanently and firmly embraced between the head of the anchor pin 93 and the upset annular shoulder 98. Since both the head 93 and the ring 98 are integral parts of the anchor pin, the apron is firmly and permanently engaged. Furthermore, the pressure exerted between the head 93 and the die while upsetting the shoulder, also tends to expand the intermediate portion of the anchor and swell it into a tight engagement with the periphery of the opening 91. As shown particularly in Fig. 12, the ends of the shoe engage the cylindrical portion 94 of the anchor pin and to guide the shoe ends laterally a flared disc like washer 100, (see also Fig. 1) is secured to the inner end of the anchor pin by upsetting the tip 95 as shown at 101, (see also Figs. 1 and 12). The anchor per se is claimed in a co-pending application Serial No. 468,522, filed July 17, 1930, which constitutes a division of this application.

Referring to Figs. 1, 9, 10, and 11, I provide retractor springs for holding the shoe out of engagement with the drum and also for centering it within the drum about the anchor pin as a pivot point. A main retractor spring 110 joins the ends of the shoes and has one end extending through the eyelet 12 in the relatively rigid end of the shoe and has its other end connected with a wire clip 111, (see also Fig. 14) which is associated with the adjustor. The clip 111 has one end extending through the pin 29 and also serves to hold the pin 29 against lateral displacement. The other end of the clip engages the head of the adjustor clamp bolt 30. The spring 110 pulls the shoe ends onto the anchor but does not engage any fixed part of the brake structure and necessarily has no effect in centering the shoe in its pivotal relation to the anchor pin.

To center the shoe and to provide that the more flexible end of the shoe first leave the anchor under the influence of the spreading force of the toggle, I provide a novel arrangement of retractor springs comprising two springs 112 and 113 lying in substantially parallel chords of the drum. The spring 113 has one end secured to the apron and the other end passed through the eyelet 13 in the part 5 of the radial flange of the shoe. The spring 112 has one end adjustably secured to the apron through the clip 114 and has its other end connected to the shoe through the eyelet 10, as shown. Referring to Figs. 1, 2, 9, 10, and 11, the clip 114 has turned over edges 115 for holding the head of a bolt 116, which bolt passes through an elongated slot 117 in the apron. By such means as a nut 118 and suitable washers 119 the clip 114 may be moved to the right or left, as shown in Fig. 1 and clamped in any desired position relative to the apron. The clip 114 carries a pair of tongues 120 which extend through the slot 117 and hold the clip against rotation while in turn holding the bolt against rotation so that the adjustment may be had from the exposed side of the apron.

As shown particularly in Fig. 1, the spring 113 engages the shoe about half way between the anchor and the middle and exerts a radial inward force tending to swing the whole shoe clockwise about the anchor. The spring 112 engages the shoe near its middle and remote from the anchor and tends to swing the whole shoe counter-clockwise about the anchor. The springs 112 and 113 are inclined relative to the apron, as shown in Fig. 1, and draw the shoe laterally toward the apron holding the edges of the shoe in contact with the extremities of the rib R, as mentioned above and shown in Fig. 17. The springs tend to swing the shoe in opposite directions and since the spring 112 is substantially twice as far away from the anchor as the spring 113, its stress is but substantially half that of the spring 113 in a position of rest. Thus the springs 112 and 113 may be of like character and then the spring 113 is normally distended substantially twice as much as the spring 112. In other words, when the shoe is in idle position, the spring 112 need not be appreciably distended, whereas the spring 113 will be distended a substantial amount. In effect therefore, the spring 112 acts as a resilient stop against which the spring 113 tends to swing the shoe.

The idle position of the shoe is determined by fixing the clip 114 in that position in which a desired uniform clearance between the shoe and the drum is maintained.

Inasmuch as the stress in the spring 113 is substantially twice as great as in the spring 112, it follows that the relatively rigid end of the shoe is urged against the anchor with substantially twice as much force as the relatively flexible end of the shoe, so that when the toggle delivers equal spreading forces to both ends of the shoe the relatively flexible end will first move from the anchor into engagement with the drum. Inasmuch as the brake is intended to act in either direction of drum rotation, and anchor on either end of the shoe, it will be appreciated that the arrangement of the springs 112 and 113 permits bodily circumferential movement of the shoe in either direction when the brake is applied.

The foregoing is a description of a preferred form of my invention to which I do not care to be particularly limited, nor do I care to be limited in any manner other than by the claims appended hereto.

I claim:—

1. In a brake, the combination of an apron, a brake shoe laterally engaging the apron at points spaced about 120° apart and means spaced about 120° from said points providing a rolling contact between the shoe and apron.

2. In a brake, the combination of an apron, a brake shoe formed as a split ring, an anchor disposed between the ends of the shoe for taking torque from either of said ends depending on the direction of drum rotation, said apron being ribbed at spaced points for laterally supporting the shoe, and means laterally supporting the ends and providing rolling contact between the shoe and the apron.

3. In a brake, the combination of an apron, a brake shoe formed as a split ring, an anchor disposed between the ends of the shoe for taking torque from either of said ends depending on the direction of drum rotation, said apron being ribbed at spaced points for laterally supporting the shoe, and means laterally supporting the ends of the shoe comprising rollers contacting with the apron carried by the ends of the shoe.

4. In a brake, the combination of an apron, a drum, an anchor carried by the apron, a substantially annular shoe having its ends engaging the anchor and means for centering the shoe within the drum comprising oppositely acting springs each connected between the shoe and the apron at different distances from the anchor and lying in substantially parallel chords of the drum.

5. In a brake, the combination of an apron, an anchor carried by the apron, a substantially annular shoe having its ends engaging the anchor and means for centering the shoe within the drum comprising oppositely acting springs each connected between the shoe and the apron at different distances from the anchor, and one of the springs having an end adjustably secured to the apron.

6. In a brake, the combination of an apron, a friction device, means upon which the friction device is pivotally mounted relative to the apron, resiliently acting means for drawing the friction device toward the apron, and means for spacing the friction device from the apron and providing rolling contact between the shoe and the apron.

7. In a brake, the combination of an apron, a drum, a friction device, means upon which the friction device is pivotally mounted relative to the apron, resiliently acting means for drawing the friction device toward the apron and holding a uniform distance from the drum comprising oppositely acting springs disposed unequal distances away from said first named means, and means for spacing the friction device from the apron and providing rolling contact between the shoe and the apron.

8. In a brake, the combination of an apron, a shoe formed as a split ring having adjacent separable ends, a lining supporting flange and a radial rib, an anchor carried by the apron and extending between said ends and taking the braking torque from either of said ends depending on the direction of drum rotation, a toggle for spreading said ends apart having its pivot pin movable toward the apron in a plane generally parallel to the axis of the anchor, and means for connecting the ends of the toggle to the ends of the shoe on the apron side of the radial rib and rollers carried by said means and contacting with said apron, the axis of said rollers lying between the radial rib and the apron.

9. In a brake, the combination of an apron, an anchor carried thereby, a shoe formed as a split ring and having separable ends engaging the anchor and being bodily swingable about said anchor, means for centering said shoe in its pivotal relation to said anchor comprising at least one spring which is adjustably connected to the apron, an axially acting toggle for spreading the ends of the shoe apart, and rollers carried by the ends of the shoe and contacting with the apron and taking the lateral thrust between the toggle and the apron.

10. In a brake, the combination of a shoe formed as a split ring having separable ends, an anchor engaged by both ends about which the shoe may swing bodily at least in idle position, means for spreading the shoe ends apart, and means for centering the shoe with respect to the anchor comprising oppositely acting springs, one tending to swing the shoe clockwise and the other tending to swing the shoe counter-clockwise, said springs being of similar character one positioned substantially twice as far from the anchor as the other and being under substantially half the strain as the other spring and not appreciably distended thereby.

11. In a brake, the combination of a shoe formed as a split ring having separable ends, an anchor engaged by both ends about which the shoe may swing bodily at least in idle position, means for spreading the shoe ends apart, and means for centering the shoe with respect to the anchor comprising oppositely acting springs, one tending to swing the shoe clockwise and the other tending to swing the shoe counter-clockwise, said springs being of similar character one positioned substantially twice as far from the anchor as the other, and being under substantially half the strain as the other spring and not appreciably distended thereby, and one of said springs being adjustably secured to the apron.

12. In a brake, the combination of an apron, a shoe disposed laterally adjacent the apron, said shoe having an inwardly extending radial flange between its edges, and said apron having reinforcing ribs raised inwardly toward the shoe and lying at least in part radially inward from the lateral edge of the shoe but spaced away from the reinforcing flange of the shoe.

13. In a brake, the combination of an apron having an inwardly raised reinforcing rib, an anchor carried in the ribbed portion of the apron, and a brake shoe formed at least in part in T-section having an inwardly extending central flange the end of which engages the anchor adjacent the reinforcing rib.

14. In a brake, the combination of an apron with a generally U-shaped inwardly raised reinforcing rib, a substantially annular brake shoe formed in T-section, the lateral edge of the shoe engaging the ends of the rib and being spaced from the body of the apron thereby, the middle of the rib lying radially inward from the edge of the shoe and extending laterally inward toward the flange of the shoe.

15. In a brake, the combination of an apron with a generally U-shaped inwardly raised reinforcing rib, a substantially annular brake shoe formed in T-section the lateral edge of the shoe engaging the ends of the rib and being spaced from the body of the apron thereby, the middle of the rib lying radially inward from the edge of the shoe and extending laterally inward toward the flange of the shoe, and an anchor pin engaged by the ends of the shoe and carried by the apron in the middle of said rib.

16. The combination of an apron, a brake shoe having a radial flange, an anchor taking torque from said shoe, a thrust part adjustably carried by the shoe and engageable with said anchor, said thrust part comprising a pair of plates secured together and notched at one end to engage said anchor, a substantially radial pin carried by said plates, a spacing roller carried by said pin and contacting with the apron, and cam means associated with the flange of the shoe for adjustably positioning said plates circumferentially of the shoe.

17. In a brake, the combination with an apron and a brake drum of a brake shoe formed as a split ring, an anchor disposed between the ends of the shoe for taking torque from either of said ends, said apron being ribbed at spaced points for supporting the shoe and means for supporting the ends of the shoe including friction reducing means, said friction reducing means holding said shoe and said apron out of contact.

18. In a brake the combination of an apron, a floating brake shoe formed as a split ring, an anchor disposed between the ends of the shoe depending upon the direction of drum rotation, spreading means connected to the ends of said shoe for exerting a circumferential force thereon to spread said ends apart, means for imposing a force on said spreading mechanism to produce separation of the ends of said shoe, said brake shoe being formed of T-section stock with a lining supporting portion and a radial reinforcing flange, said radial flange being cut away at a point remote from the ends of said shoe to give different characteristics of rigidity as well as flexibility to said shoe.

19. In a brake having a drum, the combination of an apron, a floating brake shoe formed as a split ring, said apron having a deformed portion lying inwardly from the general plane of the apron and supporting an anchor, said anchor lying between the ends of the shoe for taking torque for either of said shoe ends depending upon the direction of drum rotation, said brake shoe having sectors that vary in rigidity and flexibility.

20. In a brake, the combination of an apron, a brake shoe, laterally engaging said apron at points spaced about 120° apart, and friction reducing means associated with at least one end of the shoe and spaced about 120° from said first named points for spacing that part of the shoe from the apron.

21. In a brake, the combination of an apron having a plurality of deformed portions extending inwardly from the general plane of the apron, a brake shoe laterally engaging the deformed portion and supported throughout the major portion of its length clear of the apron, an anchor against which said shoe abuts, means for drawing said shoe against said anchor and means for drawing said shoe toward said apron.

22. In a brake, the combination of an apron, a friction device, means upon which the friction device is pivotally mounted relative to the apron, means for drawing the friction device toward the apron and means for spacing the friction device from the apron at spaced points throughout its length.

23. In a brake, the combination of an apron, a brake shoe, an anchor on which the brake shoe is pivotally mounted relative to the apron, means for drawing the friction device toward the apron, means for spacing the friction device from the apron and means for drawing the ends of the shoe against the anchor.

24. In combination, a brake shoe and a brake apron, said apron having a plurality of deformed portions extending inwardly therefrom and laterally engaging the brake shoe and spacing said shoe from the apron, an anchor on which said shoe is pivoted, means for drawing said shoe against said anchor and means for varying the positional relation of the shoe with respect to the anchor, at least one of said means tending to draw said shoe toward said apron.

25. In a brake shoe, the combination of a brake apron having deformed portions extending inwardly from the general plane of the apron, a brake anchor carried by said inwardly extending portion, said anchor lying inwardly of the general plane of the apron, said apron having a plurality of deformed portions arranged at about 120° from said anchor, a brake shoe laterally engaging said deformed portions and being spaced from the apron thereby, said brake shoe being pivotally mounted on the anchor, means for drawing said shoe against said anchor and means for drawing said shoe toward said offset portions and into seating relation therewith.

26. In a brake, the combination of an apron having portions offset inwardly from the general plane of the apron, a brake shoe formed of T-section stock and having a radial rib and a lining supporting surface, said lining supporting surface laterally engaging said inwardly offset portion of the apron and being spaced from the apron therewith, an anchor carried by one of said offset portions against which the radial part of the shoe abuts and about which said shoe pivots, means engaging the radial part of said brake shoe for drawing said shoe against the anchor, and means for varying the positional relation of the shoe with respect to the anchor, said means being associated with the radial rib of said shoe and said apron and acting to draw said shoe toward said apron.

27. In a brake, the combination of an apron having a plurality of inwardly deformed portions, a brake shoe laterally engaging said inwardly deformed portion and being spaced from the apron thereby, an anchor carried by said apron against which said brake shoe abuts, means engaging said brake shoe for drawing said shoe against the anchor and means associated with said brake shoe and said apron for drawing said shoe toward the apron, and means associated with said shoe and said apron for locating said shoe in its pivotal movement about the anchor.

28. In a brake, the combination of an apron, an anchor carried by the apron, a substantially one piece annular shoe having its ends engaging the anchor, one of said ends being more flexible than the other and means for centering the shoe within the drum comprising oppositely acting springs, engaging the flexible and less flexible ends and each being connected between the shoe and the apron at different distances from the anchor.

29. In a brake, the combination of an apron, an anchor carried thereby, a shoe formed as a split ring and having separable ends engaging the anchor and being bodily swingable about said anchor, means for centering said shoe in its pivotal relation to said anchor comprising at least one spring connected to the apron, an axially acting toggle for spreading the ends of the shoe apart, and rollers carried by the ends of the shoe and contacting with the apron and taking the lateral thrust between the toggle and the apron.

JOHN SNEED.